United States Patent Office 2,885,373
Patented May 5, 1959

2,885,373

RESINS COMPRISING POLYESTERS MODIFIED BY DEXTRAN AND A MONOETHYLENICALLY UNSATURATED MONOMER

Leo J. Novak, Dayton, Ohio, assignor to The Commonwealth Engineering Company of Ohio, Dayton, Ohio, a corporation of Ohio No Drawing. Application January 19, 1955
Serial No. 482,892

7 Claims. (Cl. 260—17.4)

The primary object of the invention is to provide new resinous or plastic materials comprising modified polyesters.

This and other objects are accomplished by reacting a polycarboxylic acid or functional derivative thereof, such as the acid anhydride, a polyhydric alcohol, and dextran, together, with heating, until a plastic resinous but fluid mass is obtained, and diluting the dextran-modified polyester with a liquid ethylenically unsaturated substance which is reacted with the polyester, to obtain a composition which may be hardened to a clear, water-resistant resin which may be re-melted and re-cast more frequently than simple polyesters or polyesters modified with the styrene or the like, but not containing dextran as a co-reactant.

The polycarboxylic acid used in preparing the resin may be, for example, maleic, phthalic, chlorofumaric, citraconic, methylethyl maleic, diethyl maleic, chlormethyl-maleic and mesaconic acids, or the anhydrides of the acids such as maleic, phthalic anhydride and so on. Examples of the polyhydric alcohols are ethylene glycol, di-, tri-, or tetraethylene glycol, trimethylene glycol, glycerol or pentaerythritol.

The dextran component of the resin is a high molecular weight polysaccharide made up of anhydroglucopyranosidic units joined by molecular structural repeating alpha-1,6 and non-alpha-1,6 linkages at least 50% of which are of the 1,6 type. The polysaccharide may be obtained in various ways, as by bacterial conversion of 1,4 linkages of dextrin to 1,6 linkages of dextran, but is usually biosynthesized from sucrose by the action of dextran-producing microorganisms such as those of the *Leuconostoc mesenteroides* or *L. dextranicum* types, or the enzymes thereof. Thus, an aqueous sucrose-bearing nutrient medium of appropriate composition may be inoculated with a culture of the selected microorganism, or the enzyme filtered from the culture, and the mass incubated until the dextran is biosynthesized in maximum yield. Under normal conventional conditions the "native" dextran thus obtained has a very high molecular weight calculated to be in the millions and may vary widely with respect to the molecular structural repeating alpha-1,6 to non-1,6 linkages ratios thereof, which variations influence other properties of the dextran.

The "native" high molecular weight dextran may be used as co-reactant in producing the new plastics of the invention or it may be partially hydrolyzed in any suitable way to dextran of lower molecular weight to obtain the dextran component. In general, the dextran used may have a molecular weight of between 5000 and that of native, microbiologically produced dextran, as determined by light scattering measurements, and a molecular structural repeating 1,6 to non-1,6 linkages ratio of 1.9:1 to 30:1. Microorganisms which may be used to produce the dextran include those bearing the following NRRL (Northern Regional Research Laboratory) designations: *Leuconostoc mesenteroides* B-512, B-119, B-1146, B-1190, B-742, B-1191, B-1196, B-1208, B-1216, B-1120, B-1144, B-523; *Streptobacterium dextranicum* B-1254 and *Betabacterium vermiforme* B-1139.

The dextran may be recovered from the fermentate by precipitation using a water-miscible aliphatic alcohol or ketone, purified and reduced to particulate condition for reaction with the polycarboxylic acid and polyhydric alcohol.

The ethylenically unsaturated diluent which is reacted with the polyester may be styrene, divinyl benzene, methylmethacrylate, vinyl acetate, diallyl phthalate or any similar substance which reacts to provide a modified polyester.

The polycarboxylic acid, polyhydric alcohol and dextran are heated together to obtain a resinous melt which is a dextran-modified partially condensed polyester. Temperatures of 50° C. to 300° C. may be used. The ethylenically unsaturated diluent is preferably added to the dextran-modified partially condensed polyester while the latter is in fluid condition but, in general, the polyester may be cooled to hardened condition and re-melted for use after the incorporation of the styrene or the like to the re-melt.

The relative proportions of the respective components may be varied, and either the polycarboxylic acid or the polyhydric alcohol may predominate, the dextran and styrene or like monomer being used in relatively small amounts. In general, the dextran-modified polyesters are formed from 30% to 65% of the polycarboxylic acid or anhydride thereof, 15% to 50% of the polyhydric alcohol, 5% to 25% of the dextran, these components being heated to the reaction temperature resulting in the fluid, resinous mass, and from 5% to 25% of the ethylenically unsaturated diluent being added to the partial condensation product, and the total of the ingredients equalling 100%. The polycarboxylic acid, polyhydric alcohol and dextran may be mixed together directly, or the dextran, or a portion thereof, may be dissolved or dispersed in the polyhydric alcohol with heating, and the solution or dispersion added to the liquid acid or functional derivative thereof, the mass being then heated with agitation to the reaction temperature and until a homogeneous, resinous viscous but fluid mass is obtained.

The following examples, in which parts are by weight unless otherwise stated, are given to illustrate specific embodiments of the invention, it being understood that these examples are not intended as limitative.

Example I

About 7.2 parts of particulate L. m. B-512 dextran (average M.W. about 30,000) are dissolved in 40.4 parts of hot glycerol, and the hot solution is added to 45.3 parts of melted maleic anhydride. The mass is boiled for 10-15 minutes with continuous stirring. The resulting dextran-modified polyester may be hardened by cooling, re-melted, about 7.1 parts of styrene mixed therewith, and the composition shaped and hardened by heating.

Example II

About 16.3 parts of particulate L. m. B-512 dextran (M.W. 30,000) are divided into two equal portions. One portion is dissolved in 16.2 parts of hot glycerol, and the other is mixed with 51.3 parts of melted maleic anhydride. The hot glycerol solution is then combined with the dextran-maleic anhydride mixture, and the mass is heated to boiling for 12 minutes with constant stirring and until a clear, homogeneous resinous fluid forms. About 16.3 parts of diallyl phthalate are added to the fluid partial condensation product. The mixture may be used as coating for a fabric or film and hardened on the substrate by heating.

Example III

The procedure of Example II is repeated, except that the mass comprising the dextran, glycerol and maleic anhydride is heated for 20 minutes during which heating time it becomes spongy in consistency. The diallyl phthalate is distributed through the spongy mass, which may then be shaped and set in the shaped condition by heating.

Example IV

About 5.0 parts of particulate *L. m.* B–512 dextran (average M.W. 30,000) are dissolved in 52 parts of hot ethylene glycol and the hot solution is added to 36.4 parts of melted phthalic anhydride. The resulting mass is boiled for 15 minutes. About 6.6 parts of styrene are added to the polyester. The composition may be shaped hot, or coated onto a suitable base, and then hardened by heating.

Example V

Example IV is repeated except that 51.3 parts of maleic anhydride are used.

Example VI

Example IV is repeated, using 5.0 parts of particulate *L. m.* B–512 dextran having a molecular weight of 20,000 to 200,000 (average 60,000 to 80,000).

Example VII

Example IV is repeated, using 5.0 parts of particulate, native (unhydrolyzed) *L. m.* B–512 dextran.

Example VIII

Example IV is repeated, using 5.0 parts of particulate native *L. m.* B–523 dextran.

Example IX

Example IV is repeated, using 5.0 parts of particulate *L. m.* B–1254 native dextran.

Example X

Example IV is repeated, using 5.0 parts of particulate native B–1146 dextran.

Example XI

About 5.0 parts of particulate *L. m.* B–512 dextran (average M. W. 30,000) are mixed with 55.3 parts of propylene glycol. The resulting gummy mass is added to 34 parts of melted maleic anhydride, and the mix is boiled for 25 minutes. About 5.7 parts of divinyl benzene are mixed with the dextran-modified polyester. The composition may be shaped and set in the shaped condition by heating or cooling.

Example XII

About 4.0 parts of particulate *L. m.* B–512 dextran (M.W. 30,000) are mixed with 16.0 parts of hot ethylene glycol and the mixture is added to 76.0 parts of melted phthalic anhydride. The mix is boiled for 25 minutes to obtain a resinous but fluid mass. About 4.0 parts of styrene are added to the fluid dextran-modified partially condensed polyester, which may be used as coating or molded and set by heating.

Example XIII

About 5.0 parts of particulate *L. m.* B–512 dextran (M.W. 30,000) are mixed with 14.8 parts of hot glycerol, and the mixture is added to 70.4 parts of melted phthalic anhydride. The mix is boiled for 25 minutes to obtain a homogeneous resinous fluid mass. About 9.8 parts of styrene are mixed into the mass. The resulting composition may be shaped and hardened by heating.

Example XIV

About 20.0 parts of particulate *L. m.* B–512 dextran (M.W. 30,000) are mixed with 47.5 parts of hot glycerol and the mixture is added to 28.3 parts of melted phthalic anhydride. On boiling for 25 minutes, a homogeneous, resinous but fluid reaction product is obtained. To the dextran-modified, partially condensed polyester there are added 5.0 parts of α-methylstyrene. After shaping of the composition or coating thereof onto a suitable base, the dextran and styrene-modified polyester may be hardened by heating.

Example XV

About 5.0 parts of *L. m.* B–512 dextran (average M.W. 30,000) are dissolved in 46.5 parts of hot glycerol and the solution is added to 44.5 parts of melted phthalic anhydride. The mixture is boiled until a resinous but still fluid and only partially condensed dextran-modified polyester is obtained. Five parts of styrene are added to the polyester. The composition may be shaped and set to hardened condition by heating.

Example XVI

About 6.5 parts of particulate *L. m.* B–512 dextran (M.W. 30,000) are mixed with 44 parts of hot ethylene glycol and the mixture is added to 46.5 parts of melted phthalic anhydride. On boiling for 25 minutes, a resinous fluid reaction product is obtained. About 4.0 parts of styrene are added to the dextran-modified partial polyester and, after shaping of the resulting composition it is set in hardened condition by heating. As in the other examples given, the final hardened product is a dextran-and-styrene-modified polyester.

Example XVII

About 3.0 parts of particulate *L. m.* B.–512 native unhydrolyzed dextran 59 parts of propylene glycol and 34 parts of phthalic anhydride are heated together at moderate temperature (50–60° C.) and then boiled for 15 minutes with constant stirring. About 7.0 parts of methyl methacrylate are added. The composition is shaped and heated.

In all of the examples illustrated, the ethylenically unsaturated diluent may be added to the fluid dextran-modified polyester obtained initially and the composition may be cooled and re-melted repeatedly, longer or more frequent heating being possible without effecting complete condensation of the polyester than is normally the case. Or the monomer may be added to the dextran-modified polyester after cooling and re-melting thereof.

It will be understood that, while maleic anhydride and phthalic anhydride have been used in the specific examples, other polycarboxylic acid anhydrides, the acids as such, or other functional derivatives thereof may be substituted for the maleic or phthalic anhydride to obtain the modified polyesters of the invention. Likewise, other polyhydric alcohols, dextran of other molecular weight and 1,6 to non-1,6 linkages ratio, and other ethylenically unsaturated diluents may be substituted for those exemplified.

The reaction of the unsaturated acid or derivative, the polyhydric alcohol and the dextran may be carried out in an atmosphere of an inert gas such as carbon dioxide, nitrogen or the like, in order to inhibit darkening of the product and insure the production of pale or essentially colorless products. The inert gas may be bubbled through the reacting ingredients, the gas in that case also serving to agitate the mass and expedite removal of any water formed in the reaction.

The reaction proceeds so readily that use of a catalyst usually is not warranted. However, a suitable catalyst may be used, if desired. Examples of such useful catalysts are ozone, ozonides, inorganic super oxides such as barium peroxide, sodium peroxide, etc., aliphatic acyl peroxides, e.g., acetyl peroxide, lauryl peroxide, stearyl peroxide, etc., peroxides of the aromatic acid series such as benzoyl peroxide, p-chlorobenzoyl peroxide, etc., mixed organic peroxides such as acetyl benzoyl peroxide, ketone peroxides of the type of acetone peroxide, triacetone peroxide, alkyl derivatives of hydrogen peroxide including ethyl hydrogen peroxide, diethyl peroxide, various per compounds such as perborates, persulfates, perchlorates, etc., aluminum salts such as the halides, e.g., aluminum chloride. When a catalyst is used, however, it is preferably benzoyl peroxide in any suitable amount and usually in a concentration of 0.1% to 1.5% by weight of the total charge.

Pigments, dyes, fillers and special effect materials including metallic particles may be mixed with the mass before it is shaped or applied as coating.

In the dextran-modified polyesters, the dextran functions, to the extent of its presence, as a co-reacted diluent which diminishes the thermosetting property characteristic of the polyester resins, the extent of the diminution depending on the polyhydric alcohol reactant. Thus, the dextran-modified polyester obtained by heating the dextran, acid or anhydride, and glycerol or other alcohol containing more than two hydroxyl groups tend to be more definitely thermosetting, while those obtained by heating the dextran, acid or anhydride, and a dihydric alcohol such as ethylene glycol tend to be more definitely thermoplastic. However, the modified polyesters derived from both types of alcohols are generally on the borderline between thermosetting and thermoplastic and may be set in hardened condition by cooling or heating, and may be alternately cooled and heated more frequently than is usually possible with the polyesters. In other words, the dextran-modified polyesters can be heated to higher temperatures for longer times than is usual for polyesters and styrene-containing polyesters, and this characteristic is also present in the dextran-modified polyesters that are also modified as described. Those compositions of the invention that are more expeditiously set by cooling, can be cooled, re-melted, and re-set repeatedly, even if the styrene or the like, which normally increases the susceptibility to heat of the polyesters and increases the thermosetting properties thereof, is mixed with the dextran-modified partially condensed polyester in its initial fluid state.

Since changes and modifications may be made in details in practicing the invention without departing from the spirit and scope thereof, it is to be understood that it is not intended to limit the invention except as it is defined in the appended claims.

What is claimed is:

1. A reaction product prepared by admixing and heating a polyester and an ethylenically unsaturated compound selected from the group consisting of styrene, divinyl benzene, methylmethacrylate, vinyl acetate and diallyl phthalate, said polyester being prepared by heating together a mixture consisting of 30 to 65% by weight of a polycarboxylic compound selected from the group consisting of maleic and phthalic acid and their anhydrides, from 15 to 50% by weight of a polyhydric alcohol, and from 5 to 25% by weight of dextran to obtain a dextran-modified polyester reaction product.

2. A reaction product prepared by admixing and heating a polyester and styrene, said polyester being prepared by heating together a mixture consisting of from 30 to 65% by weight of phthalic anhydride, from 15 to 50% by weight of ethylene glycol, and from 5 to 50% by weight of dextran to obtain a dextran-modified polyester reaction product.

3. A reaction product prepared by admixing and heating a polyester and styrene, said polyester being prepared by heating together a mixture consisting of from 30 to 65% by weight of maleic anhydride, from 15 to 50% by weight of glycerol, and from 5 to 50% by weight of dextran to obtain a dextran-modified polyester reaction product.

4. A reaction product prepared as set forth in claim 1, wherein said ethylenically unsaturated compound reacted with the polyester is divinyl benzene.

5. A reaction product prepared as set forth in claim 1, wherein said ethylenically unsaturated compound reacted with the polyester is methylmethacrylate.

6. A reaction product prepared as set forth in claim 1, wherein said ethylenically unsaturated compound reacted with the polyester is vinyl acetate.

7. A reaction product prepared as set forth in claim 1, wherein said ethylenically unsaturated compound reacted with the polyester is diallyl phthalate.

References Cited in the file of this patent

UNITED STATES PATENTS

| | | |
|---|---|---|
| 1,108,329 | Callahan | Aug. 25, 1914 |
| 2,255,313 | Ellis | Sept. 9, 1941 |
| 2,624,768 | Toulmin | Jan. 6, 1953 |